US012557796B2

(12) United States Patent
Marks

(10) Patent No.: US 12,557,796 B2
(45) Date of Patent: Feb. 24, 2026

(54) SELF-REGULATING PROTEIN SKIMMER AND RETROFIT KITS FOR RETROFITTING NON SELF-REGULATING PROTEIN SKIMMERS

(71) Applicant: RED SEA AQUATICS DEVELOPMENT LTD., Herzlia (IL)

(72) Inventor: Neil H. Marks, Ra'anana (IL)

(73) Assignee: RED SEA AQUATICS DEVELOPMENT LTD., Herzlia (IL)

( * ) Notice: Subject to any disclaimer, the term of this patent is extended or adjusted under 35 U.S.C. 154(b) by 0 days.

(21) Appl. No.: 19/134,545

(22) PCT Filed: Dec. 14, 2023

(86) PCT No.: PCT/IL2023/051270
§ 371 (c)(1),
(2) Date: May 30, 2025

(87) PCT Pub. No.: WO2024/134647
PCT Pub. Date: Jun. 27, 2024

(65) Prior Publication Data
US 2026/0007121 A1     Jan. 8, 2026

(30) Foreign Application Priority Data

Dec. 18, 2022     (IL) .......................................... 299208

(51) Int. Cl.
*A01K 63/04*            (2006.01)
(52) U.S. Cl.
CPC .......... *A01K 63/045* (2013.01); *A01K 63/047* (2013.01)

(58) Field of Classification Search
CPC ..... A01K 63/045; A01K 63/04; A01K 63/047
See application file for complete search history.

(56) References Cited

U.S. PATENT DOCUMENTS

| | | |
|---|---|---|
| 3,525,437 A | 8/1970 | Kaeding et al. |
| 3,957,017 A | 5/1976 | Carmignani et al. |
| (Continued) | | |

FOREIGN PATENT DOCUMENTS

| | | |
|---|---|---|
| CN | 203618583 U | 6/2014 |
| CN | 104585113 A | 5/2015 |
| (Continued) | | |

OTHER PUBLICATIONS

International Search Report issued Feb. 22, 2024 in International Application No. PCT/IL2023/051270.

(Continued)

*Primary Examiner* — Kristen C Hayes
(74) *Attorney, Agent, or Firm* — Panitch Schwarze Belisario & Nadel LLP

(57) ABSTRACT

Mains operated self-regulating protein skimmer including a skimmer pump for pumping an air/organic loaded water mixture into its reaction chamber, an electrical conductivity (EC) sensor for deployment in its foam collection neck for sensing foam wetness, and a controller for controlling fluid flow rate through the protein skimmer in response to the EC sensor's foam wetness readings. Fluid flow rate can be controlled either by a variable flow DC skimmer pump and/or a motorized outlet port regulator for controlling an outlet port's outlet port area.

10 Claims, 5 Drawing Sheets

(56) References Cited

U.S. PATENT DOCUMENTS

| | | | |
|---|---|---|---|
| 3,965,007 A | | 6/1976 | Conn et al. |
| 3,994,811 A | | 11/1976 | Cohen et al. |
| 4,033,719 A | | 7/1977 | Conn et al. |
| 4,512,885 A | | 4/1985 | Willinger |
| 4,602,996 A | | 7/1986 | Willinger |
| D291,720 S | | 9/1987 | Willinger et al. |
| 4,764,311 A | | 8/1988 | Klaes |
| 4,834,872 A | | 5/1989 | Overath |
| 4,988,436 A | | 1/1991 | Cole |
| 4,997,559 A | | 3/1991 | Ellis et al. |
| 5,006,230 A | | 4/1991 | Votava, III et al. |
| 5,078,867 A | | 1/1992 | Danner |
| 5,084,164 A | | 1/1992 | Del Rosario |
| 5,098,585 A | | 3/1992 | Woltman et al. |
| 5,282,962 A | | 2/1994 | Chen |
| 5,380,160 A | | 1/1995 | Chen |
| 5,385,665 A | | 1/1995 | Neuhaus |
| 5,484,525 A | | 1/1996 | Mowka, Jr. |
| D368,297 S | | 3/1996 | Dunlap |
| 5,522,987 A | | 6/1996 | Bresolin |
| 5,554,280 A | | 9/1996 | Loehr |
| 5,562,821 A | | 10/1996 | Gutierrez-Collazo |
| 5,665,227 A | | 9/1997 | Watt |
| 5,667,671 A | | 9/1997 | Munsch et al. |
| 5,728,293 A | | 3/1998 | Guoli et al. |
| 5,736,034 A | | 4/1998 | Phillips et al. |
| 5,776,335 A | | 7/1998 | Overath |
| 5,800,704 A | * | 9/1998 | Hansen ............... F04D 29/2288 261/84 |
| 6,054,045 A | | 4/2000 | Wittstock et al. |
| D428,469 S | | 7/2000 | Puiggros Roig |
| 6,156,209 A | * | 12/2000 | Kim ....................... A01K 63/04 210/776 |
| 6,303,028 B1 | | 10/2001 | Marks et al. |
| D451,580 S | | 12/2001 | Marks et al. |
| 6,436,295 B2 | | 8/2002 | Kim |
| 6,808,625 B1 | | 10/2004 | Wu |
| 7,029,577 B2 | | 4/2006 | Cummins |
| 7,121,535 B2 | | 10/2006 | Curlee et al. |
| 7,264,714 B2 | | 9/2007 | Joneid |
| 7,309,443 B2 | | 12/2007 | Kelty |
| 7,316,776 B2 | | 1/2008 | Kieselbach |
| 7,445,706 B2 | * | 11/2008 | Liu ....................... A01K 63/045 210/167.26 |
| 7,867,386 B2 | | 1/2011 | Tunze et al. |
| 8,268,166 B2 | * | 9/2012 | Marks ................... A01K 63/04 210/167.25 |
| 2003/0201232 A1 | | 10/2003 | Cheyne |
| 2004/0164011 A1 | | 8/2004 | Geudtner |
| 2005/0183998 A1 | | 8/2005 | Joneid |
| 2006/0065987 A1 | | 3/2006 | Schletz |
| 2006/0180532 A1 | | 8/2006 | Cummins |
| 2007/0069403 A1 | | 3/2007 | Schletz et al. |
| 2007/0193956 A1 | | 8/2007 | Nelson |
| 2007/0278144 A1 | | 12/2007 | Wong |
| 2017/0065984 A1 | | 3/2017 | Behzad |

FOREIGN PATENT DOCUMENTS

| | | |
|---|---|---|
| DE | 19825162 A1 | 4/2000 |
| DE | 20319867 U1 | 3/2004 |
| DE | 102004062519 A1 | 7/2006 |
| JP | 2003304774 A | 10/2003 |
| WO | 2004017724 A1 | 3/2004 |
| WO | 2004017726 A1 | 3/2004 |
| WO | 2018157553 A1 | 9/2018 |
| WO | 2019111238 A1 | 6/2019 |
| WO | 2022032200 A2 | 2/2022 |
| WO | 2022118292 A1 | 6/2022 |
| WO | 2022167958 A1 | 8/2022 |

OTHER PUBLICATIONS

Written Opinion issued Feb. 22, 2024 in International Application No. PCT/IL2023/051270.

Anonymous, "Refeer Skimmer User Manual," pp. 1-84 (2021). XP093129948, Retrieved from the Internet: URL: https://gl.redseafish.com/wp-content/uploads/2020/11/4071_Skimmer-Manual_EN_FR_D E_JP_CH_-v21a.pdf [retrieved on Feb. 12, 2024].

\* cited by examiner

*10*

*21*

*18B*

*24*

*A*

*18*

*18A*

*18C*

*17*

*19*

*22*

*11*

*12*

*50*

*51*

AIR

ORGANIC
LOADED →
WATER

*14*

ORGANIC FREE WATER

*13*

*16*

CONTROLLER

*23*

SELF-REGULATING PROTEIN SKIMMER AND RETROFIT KITS FOR RETROFITTING NON SELF-REGULATING PROTEIN SKIMMERS

CROSS-REFERENCE TO RELATED APPLICATIONS

This application is a Section 371 of International Application No PCT/IL2023/051270, filed Dec. 14, 2023, which was published in the English language on Jun. 27, 2024, under International Publication No. WO 2024/134647 A1, which claims priority under 35 U.S.C. § 119(b) to Israeli Application No. 299208, filed Dec. 18, 2022, the disclosures of each of which are incorporated herein by reference.

FIELD OF THE INVENTION

The invention pertains to protein skimmers for use in aquariums.

BACKGROUND OF THE INVENTION

Protein skimmers include an upright lower housing with a reaction chamber and an outlet port, and an upright upper foam collection cup. The foam collection cup includes an upright central foam collection neck in flow communication with the reaction chamber and a foam collection surround surrounding the foam collection neck. Protein skimmers include a skimmer pump for pumping an air/organic loaded water mixture into a reaction chamber. Protein skimmers foam fractionate an air/organic loaded water mixture to organic loaded foam in a foam collection neck for eventual collection of organic loaded waste in a foam collection surround and relatively organic free water for assisting to maintain a controlled aquatic environment in an aquarium tank. Organic loaded foam is water based and therefore foam fractionation necessarily involves loss of aquarium water from an aquarium tank which has to be replaced. Protein skimmers include an outlet port regulator for regulating egress of relatively organic free water through an outlet port. Protein skimmers and their skimmer pumps are commensurately sized for their intended aquarium tanks.

Protein skimmers are set up for optimal foam fractionation, namely, efficient removal of organic loaded waste collected in the foam collection surround with minimum loss of aquarium water but are prone to so-called over-skimming primarily due to organic load fluctuations in organic loaded water during operation. Over-skimming can occur as a consequence of adding food to an aquarium, performing routine maintenance activities, and the like, and leads to an undesirable increased removal of aquarium water compared to an intended minimal removal of aquarium water. Over-skimming can be avoided by operating a protein skimmer at sub optimal foam fractionation but to the detriment of water quality.

SUMMARY OF THE INVENTION

The present invention is directed towards a mains operated self-regulating protein skimmer including a skimmer pump for pumping an air/organic loaded water mixture into its reaction chamber, an electrical conductivity (EC) sensor for deployment in its foam collection neck for sensing foam wetness, and a controller for controlling fluid flow rate through the protein skimmer in response to the EC sensor's foam wetness readings. Fluid flow rate through a protein skimmer can be controlled either by a variable flow DC skimmer pump and/or a motorized outlet port regulator for controlling an outlet port's outlet port area. Taking into consideration the EC sensor is gradually coated by bio-film during operation, the EC sensor is designed to provide reliable EC readings over a reasonably extended time period of, say, about seven days, before having to be cleaned. For the purpose of the present invention, the EC sensor is required to provide EC readings relative to a 100% EC reading when fully immersed in the aquarium in which the protein skimmer is intended to be deployed as opposed to, for example, water quality applications requiring absolute EC readings.

Initial user set-up of a protein skimmer of the present invention includes setting an optimal fluid flow rate of its specific skimmer pump for optimal foam fractionation. For illustrative purposes, optimal fluid flow rate is set at about 90% of maximal fluid flow rate. Average foam wetness at optimal fluid flow rate is typically in the order of about 60% of EC sensor's 100% EC reading. The protein skimmer is intended to be operated for relatively long periods at optimal foam fractionation without triggering a so-called self-leveling procedure on detection of an increase in organic loaded foam's wetness above a foam wetness threshold indicative of potential over-skimming which is to be avoided. Accordingly, initial user set-up of a protein skimmer also includes setting a foam wetness threshold for organic loaded foam in the foam collection neck which is necessarily higher than average foam wetness at optimal fluid flow rate. For illustrative purposes, the EC sensor's foam wetness threshold is usually set at, say, 72% of the EC sensor's 100% EC reading. On such detection, the controller automatically sharply reduces fluid flow rate through the protein skimmer thereby reducing foam fractionation and likelihood of over-skimming. For illustrative purposes, the controller reduces fluid flow rate from about 90% of maximal fluid flow rate to, say, about 75% of maximal fluid flow rate.

As part of the self-leveling procedure, the controller incrementally increases fluid flow rate towards the optimal fluid flow rate while at the same time continuously comparing the EC sensor's prevailing foam wetness reading to the foam wetness threshold. In the event of detection of a spike in the EC sensor's prevailing foam wetness reading, the controller temporarily decrements fluid flow rate for consequently temporarily reducing foam fractionation and therefore foam wetness as sensed by the EC sensor. Over the course of time, the controller reverts the fluid flow rate to the optimal fluid flow rate for optimal foam fractionation considered as the end of the self-leveling procedure. Fluid flow rate can preferably be adjusted in increments and decrements of, say, from about 1% fluid flow rate to 3% fluid flow rate.

A self-regulating protein skimmer can preferably include a second EC sensor for sensing organic loaded waste wetness of organic loaded waste in its foam collection surround for detecting when the foam collection surround is nearly full and there is a likelihood an overflow of organic loaded waste. The second EC sensor preferably triggers the controller for two purposes: First, considerably sharply reducing fluid flow rate sufficient for aeration purposes with minimal foam fractionation, if at all. And second, issuing a user alert for alerting the user to empty the foam collection surround. The second EC sensor sensing the organic loaded waste wetness necessarily overrides the EC sensor sensing foam wetness in terms of controlling fluid flow rate through the protein skimmer. For illustrative purpose, if optimal fluid flow rate for optimal foam fractionation is set at about 90% of maximal fluid flow rate through a protein skimmer, then its fluid flow rate for primarily aeration with minimal foam fractionation, if at all, is set at about 60% of maximal fluid flow rate.

The controller is preferably in remote communication with a smartphone app for setting same and receiving user alerts regarding fluid flow rate. The present invention can be equally implemented on protein skimmers intended for deployment in an aquarium tank, in a sump or as a stand-alone unit. The present invention can be equally implemented for protein skimmers having permanently attached or manually removable foam collection cups.

The present invention can also be implemented as a retrofit kit for retrofitting a non self-regulating protein skimmer to a self-regulating protein skimmer. The present invention envisages two types of retrofit kit as follows: A first retrofit kit including a variable flow DC skimmer pump to replace an existing non-variable skimmer pump, a user set pump controller to replace an existing user set pump controller, if provided, an EC sensor for mounting in the protein skimmer's foam collection neck and preferably a second EC sensor for mounting in the protein skimmer's foam collection surround for providing an alert regarding the foam collection cup being full and requiring emptying. And a second retrofit kit including a servo-motor for controlling a motorized outlet port regulator, a user set controller for controlling the outlet port regulator, an EC sensor for mounting in the protein skimmer's foam collection neck and preferably a second EC sensor for mounting in the protein skimmer's foam collection surround for providing an alert regarding the foam collection cup being full and requiring emptying.

BRIEF DESCRIPTION OF DRAWINGS

In order to understand the invention and to see how it can be carried out in practice, preferred embodiments will now be described, by way of non-limiting examples only, with reference to the accompanying drawings in which similar parts are likewise numbered, and in which.

DETAILED DESCRIPTION OF DRAWINGS

Figure 1:
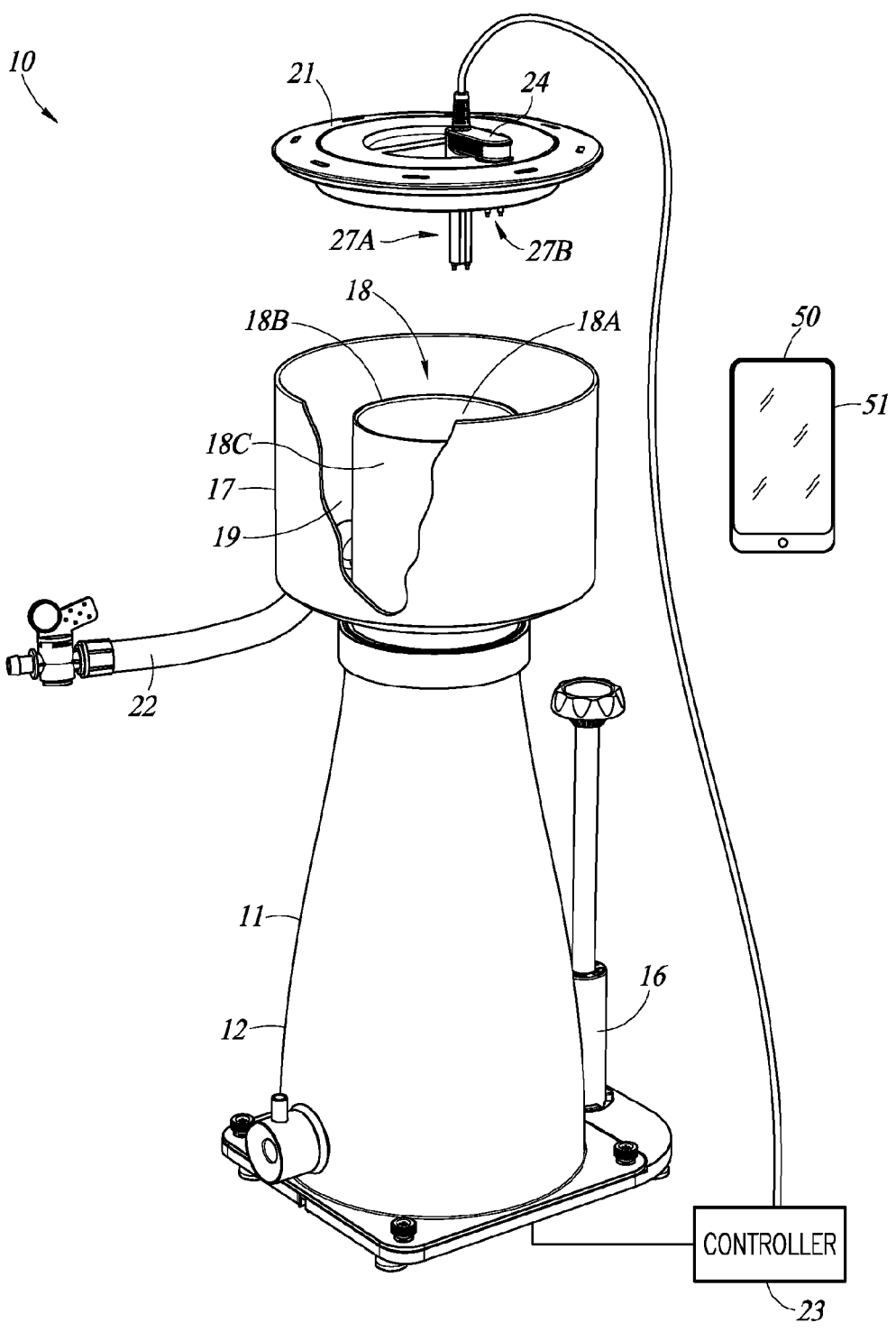
FIG. 1 is a partially exploded front perspective view of a self-regulating protein skimmer including a skimmer pump, a foam collection cup having a foam collection neck and a foam collection surround, and an electrical conductivity (EC) sensor unit.
Figure 2:
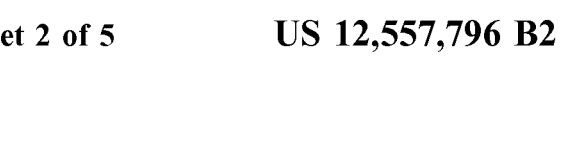
FIG. 2 is a longitudinal cross section of one embodiment of a self-regulating protein skimmer during operation.
Figure 3:
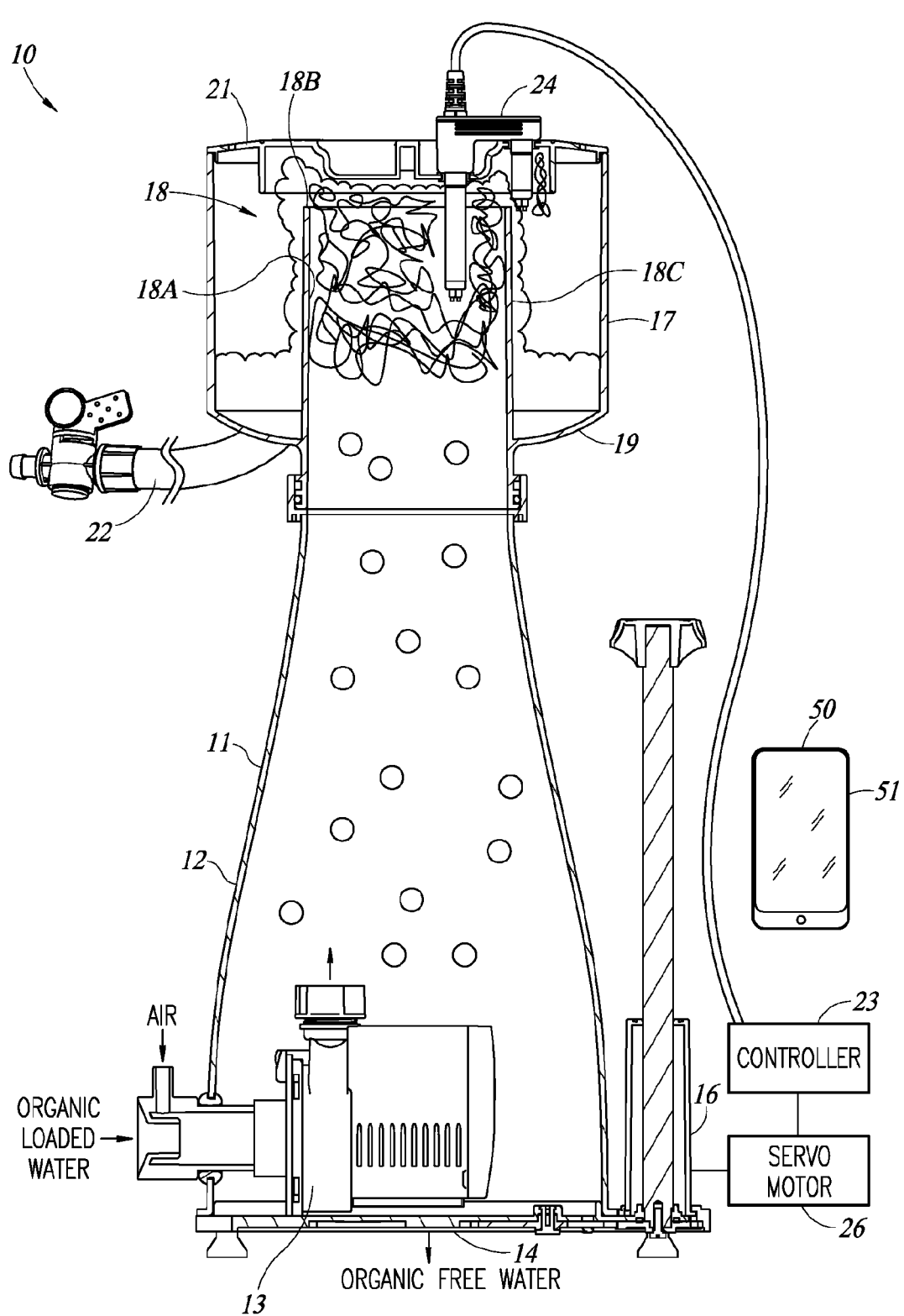
FIG. 3 is a longitudinal cross section of another embodiment of a self-regulating protein skimmer during operation.

Construction of self-regulating protein skimmer FIG. 1 to FIG. 3 show a mains operated self-regulating protein skimmer 10 for deployment in a sump. The protein skimmer 10 is intended for use with a user's smartphone 50 installed with a smartphone app 51 for enabling control of the protein skimmer 10 and providing user information including user alerts. The protein skimmer 10 includes an upright lower housing 11 having a reaction chamber 12 for foam fractionating an air/organic loaded water mixture to organic loaded foam and relatively organic free water, a skimmer pump 13 for pumping the air/organic loaded water mixture into the reaction chamber 12, and an outlet port 14 for egress of relatively organic free water from the reaction chamber 12. The protein skimmer 10 includes an outlet port regulator 16 for controlling the outlet port 14's outlet port area.

The protein skimmer 10 includes an upright foam collection cup 17 having an upright central foam collection neck 18 in flow communication with the reaction chamber 12 and a foam collection surround 19 surrounding the foam collection neck 18. The foam collection neck 18 has a foam collection neck interior surface 18A, a foam collection neck uppermost rim 18B, and a foam collection neck exterior surface 18C. The protein skimmer 10 foam fractionates air/organic loaded water mixture to an organic loaded foam column in the foam collection neck 18. The organic loaded foam column has a highly aerated foam phase towards the foam collection neck uppermost rim 18B and a predominantly liquid phase beneath the foam phase. The organic loaded foam column is constituted by continuously randomly moving relatively large conductive air bubbles with highly conductive film surfaces. The foam collection cup 17 includes a manually removable foam collection cup cover 21 raised with respect to the foam collection neck 18 for acting as a foam barrier for downwardly guiding organic loaded foam spilling over the foam collection neck 18 into the foam collection surround 19. The foam collection surround 19 preferably includes a drainage pipe 22 for draining soiled aquarium water therefrom.

The protein skimmer 10 includes a user set controller 23 and an Electrical Conductivity (EC) sensor unit 24 for sensing foam wetness in the foam collection neck 18 and organic loaded waste wetness in the foam collection surround 19 for providing output signals to the controller 23 for controlling fluid flow rate through the protein skimmer 10. The EC sensor unit 24 can be in wired or wireless communication with the controller 23. The controller 23 can control fluid flow rate through the protein skimmer 10 either by controlling a variable flow DC skimmer pump (see FIG. 2) and/or a motorized outlet port regulator 16 including a servo-motor 26 (see FIG. 3). The controller 23 is preferably operated by the smartphone app 51 for setting optimal fluid flow rate for optimal foam fractionation, a foam wetness threshold for foam wetness in the foam collection neck 18, and a waste wetness threshold for organic loaded waste in the foam collection surround 19. Additionally the controller 23 can include manual controls for setting same.

EC Sensor Unit

Figures 4, 5:
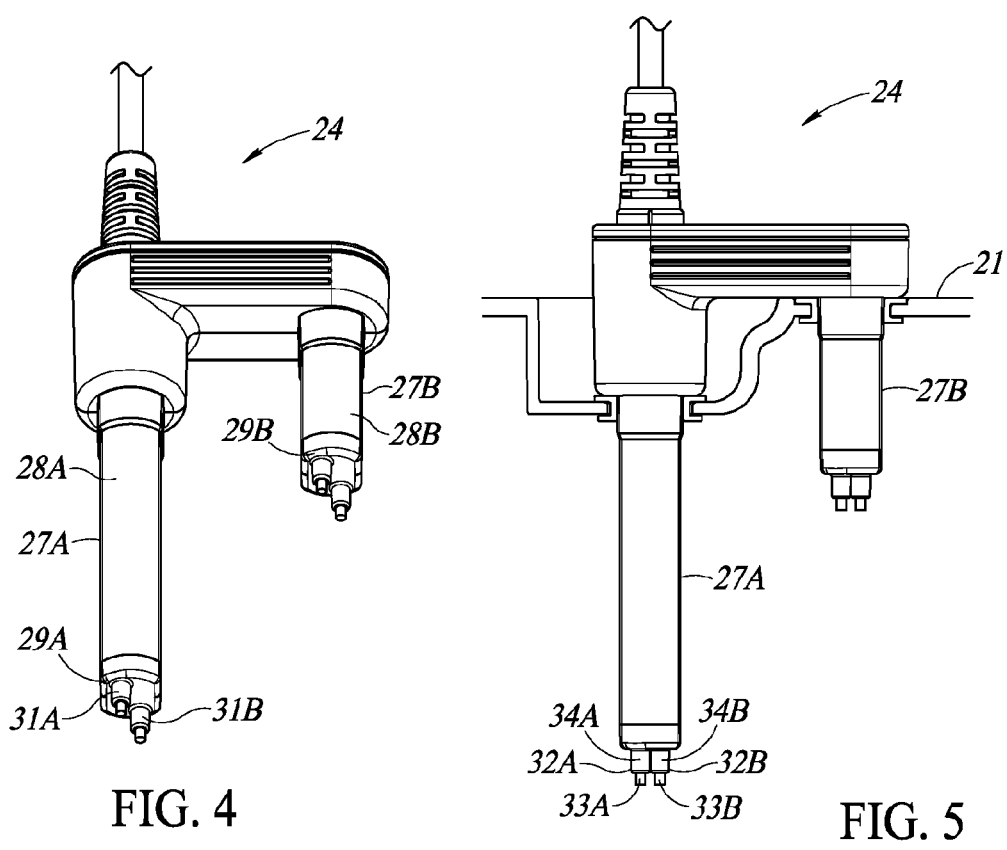
FIG. 4 is a front bottom perspective view of the EC sensor unit.
FIG. 5 is a close-up view of FIG. 2's encircled area A before use.
Figure 6:
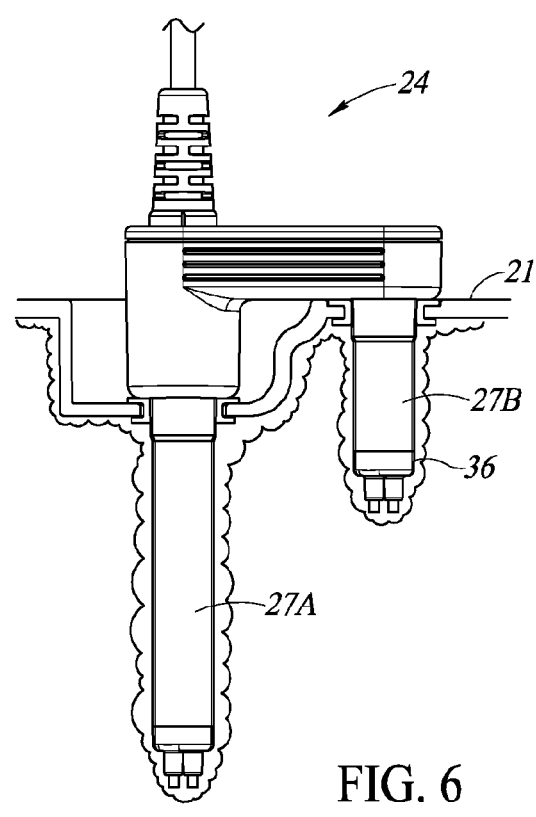
FIG. 6 is a close-up view of FIG. 2's encircled area A after continued use.

FIG. 4 to FIG. 6 show the EC sensor unit 24 has an inverted generally U-shaped construction for mounting in the foam collection cup cover 21. The EC sensor unit 24 has an EC sensor 27A and an EC sensor 27B having the same construction and differing therebetween insofar as the EC sensor 27A is longer than the EC sensor 27B by virtue of their intended uses. The EC sensor 27A is intended for sensing foam wetness in the organic loaded foam column's highly aerated foam phase and not its predominantly liquid phase therebeneath. The EC sensor 27A's consecutive electrical conductivity readings of foam wetness can vary considerably depending on instantaneous air bubble contact therewith, and consequently foam wetness readings are averaged over a predetermined time period, say, 3 to 5 seconds. The EC sensor 27B is intended for sensing electrical conductivity of organic loaded waste in the foam collection surround 19 for effectively determining the organic loaded waste's height. The EC sensor 27B is similarly deployed in a largely organic loaded foam based environment by virtue of organic loaded foam being downwardly guided by the foam collection lid 21 into the foam collection surround 19. Accordingly, the use of the EC sensor unit 24 for sensing foam wetness and organic loaded waste wetness differ from the conventional use of immersing an EC sensor in water. The EC sensor unit 24 is also designed to provide reliable EC readings even as its EC sensor 27A and EC sensor 27B are gradually covered by bio-film 36 during operation (see FIG. 6).

The EC sensors 27A and 27B include corresponding EC sensor housings 28A and 28B. The EC sensor housings 28A and 28B have corresponding EC sensor housing lowermost surfaces 29A and 29B. Each EC sensor housing lowermost surface 29 has a downward depending pair of spaced apart electrodes 31A and 31B. The electrodes 31A and 31B are spaced apart by an about 8 mm separation which is designed, on the one hand, to be wide enough to avoid a permanent electrical connection therebetween and, on the other hand, to be narrow enough to enable a selective electrical connection therebetween. The electrodes 31A and 31B have corresponding insulated electrode trailing sections 32A and 32B and corresponding exposed electrode leading sections 33A and 33B correspondingly adjacent and remote from the EC sensor housing lowermost surfaces 29A and 29B. The insulated electrode trailing sections 32A and 32B are fitted with correspondingly say 3 mm-4 mm long insulators 34A and 34B leaving, say, 2 mm-3 mm exposed electrode leading sections 33A and 33B such that the EC sensors 27A and 27B are electrically conductive between their pair of spaced apart exposed electrode leading sections 33A and 33B and not electrically conductive between their pair of spaced apart insulated electrode trailing sections 32A and 32B.

Set Up of Self-Regulating Protein Skimmer in an Aquarium

Set up includes the following steps:

Installing the smartphone app 51 on smartphone 50 for remote communication with the controller 23

Setting optimal fluid flow rate for efficient removal of organic loaded waste with minimum removal of aquarium water, namely, optimal foam fractionation. For illustrative purposes, optimal fluid flow rate is set at, say, 90% of maximal fluid flow rate.

Prevention of over-skimming set-up

Calibrating the EC sensor 27A between 0% EC reading in air and 100% EC reading when fully immersed in the aquarium in which the protein skimmer is intended to be deployed Deploying the EC sensor 27a in the foam collection neck 18

Setting the EC sensor 27A's foam wetness threshold at, say, 72% of its 100% EC reading Setting reduced fluid flow rate for preventing over-skimming. For illustrative purposes, reduced fluid flow rate is set at, say, 75% of maximal fluid flow rate Prevention of organic waste overflow set-up Calibrating the EC sensor 27B between 0% EC reading in air and 100% EC reading when fully immersed in the aquarium in which the protein skimmer is intended to be deployed Deploying the EC sensor 27B in the foam collection surround 19

Figure 7:
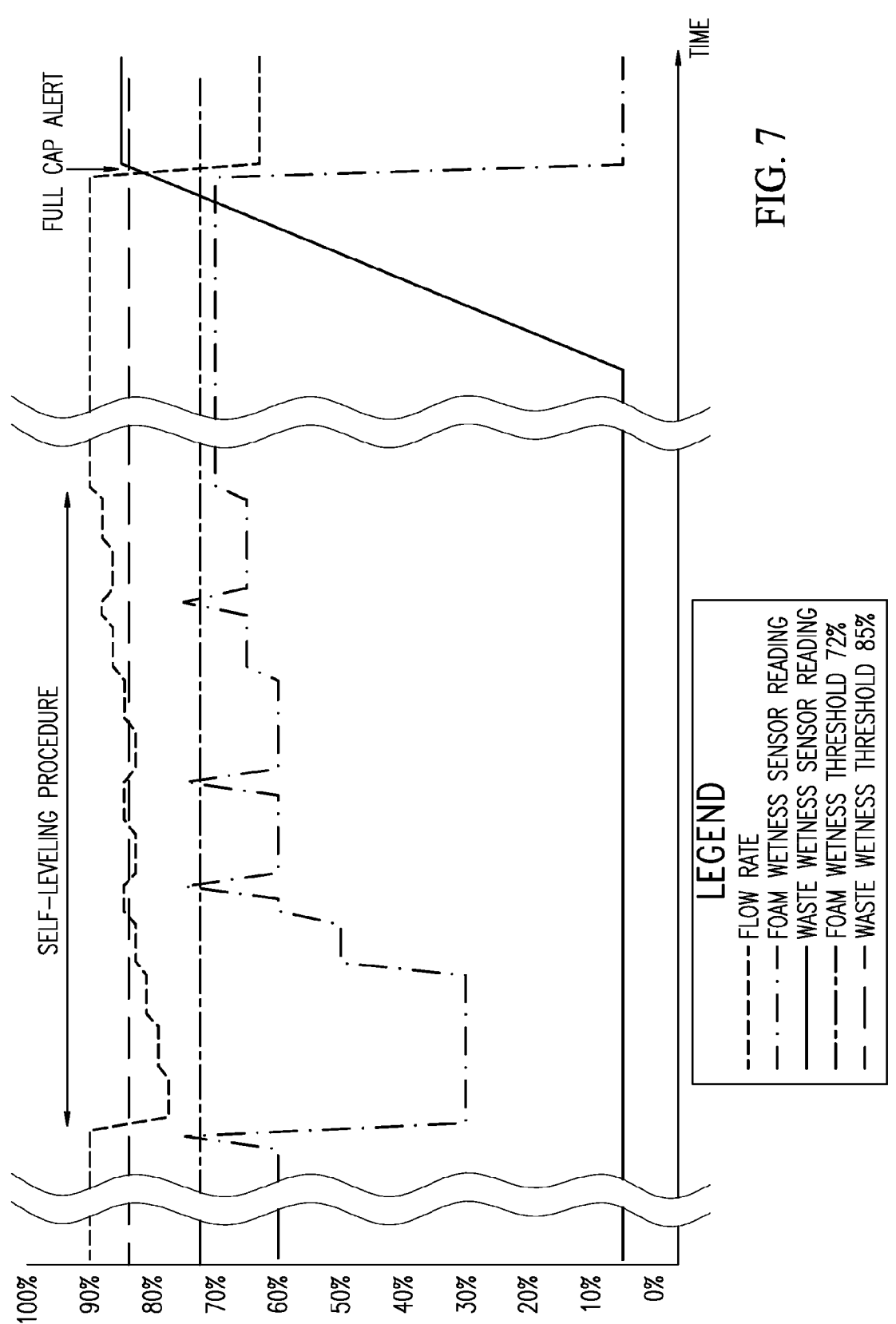
FIG. 7 is a graph demonstrating maintaining optimal foam fractionation while precluding over-skimming and alerting a user regarding a full foam collection cup.

Setting the EC sensor 27B's organic loaded waste wetness threshold at, say, 85% of its 100% EC reading Setting reduced fluid flow rate for primarily aeration purposes only with minimal foam fractionation, if at all, and issuing a user alert for emptying the foam collection surround. For illustrative purposes, reduced fluid flow rate is set at, say, 60% of maximal fluid flow rate Operation of self-regulating protein skimmer FIG. 7 exemplifies operation of the protein skimmer 10 for maintaining optimal foam fractionation while precluding over-skimming and overflowing of organic loaded waste, and alerting a user to empty a full foam collection surround. FIG. 7 also exemplifies a so-called self-leveling procedure. The smartphone app 51 is configured to display an optimal fluid flow rate set by a user as well as the prevailing fluid flow rate through the protein skimmer. The smartphone app 51 is also preferably configured to show a prevailing foam wetness reading and a prevailing organic loaded waste wetness reading.

FIG. 7's left hand side demonstrates the protein skimmer 10's initial operation, namely, 90% optimal fluid flow rate and a 60% foam wetness reading safely below the 72% foam wetness threshold. Foam fractionation causes organic loaded foam to build up in the foam collection neck 18 and relatively organic free water to egress from the outlet port 14. The organic loaded foam spills over the foam collection neck uppermost rim 18B and slides down the foam collection neck exterior surface 18C into the foam collection surround 19.

Ongoing foam fractionation can trigger a self-leveling procedure as described below.

FIG. 7's right hand side shows that on continued operation of the protein skimmer 10, organic loaded waste gradually accumulates in the foam collection surround 19 until it reaches the EC sensor 27B. Accordingly, the controller 23 reduces the fluid flow rate through the protein skimmer 10 to the pre-set 60% fluid flow rate for aeration purposes with minimal foam fractionation, if at all. Accordingly, the EC sensor 27A's foam wetness reading drops to near zero due to the absence of organic loaded foam in the foam collection neck 18 in the EC sensor 27A's vicinity. The user is preferably alerted the foam collection surround 19 requires cleaning to remove the built up organic loaded waste.

Self-Leveling Procedure

During routine operation, on detection of a sudden spike in the organic loaded foam's wetness beyond the 72% foam wetness threshold which is indicative of potential over-skimming which is intended to be avoided, the controller 23 automatically initiates a self-leveling procedure as follows: The controller 23 sharply reduces fluid flow rate from its 90% optimal fluid flow rate to, say, the pre-set 75% reduced fluid flow rate, thereby effectively interrupting foam fractionation, thereby preventing over-skimming. The sharp reduction in the fluid flow rate leads to an immediate sharp reduction in the EC sensor 27A's foam wetness reading, to, say, 30%.

After a short period of several minutes, the controller 23 starts to incrementally increase the fluid flow rate in, say, 2% increments. At each increment, the fluid flow rate is maintained for a few minutes before the next increment. Accordingly, the controller 23 requires to incremental fluid flow rate through the protein skimmer 10 by eight 2% increments to return from its 75% reduced fluid flow rate to its 90% optimal fluid flow rate, namely, routine operation.

If, however, before reaching the 90% optimal fluid flow rate, the EC sensor 27A's foam wetness reading again exceeds the 72% foam wetness threshold, the controller 23 decrements the fluid flow rate by a 2% decrement for reducing foam fractionation. FIG. 7's self-leveling procedure shows three such instances of the foam wetness readings exceeding the 72% foam wetness threshold after its initiation. The 2% increments and decrements continue automatically until the protein skimmer 10's fluid flow rate is successfully returned to the 90% optimal fluid flow rate. In this way, the protein skimmer 10 self-levels skimming activity to prevent over-skimming while maintaining skimming action throughout the self-levelling procedure.

While the invention has been described with respect to a limited number of embodiments, it will be appreciated that many variations, modifications, and other applications of the invention can be made within the scope of the appended claims.

The invention claimed is:

1. A self-regulating protein skimmer for use in aquariums, the protein skimmer comprising:

a) an upright lower housing including:

i) a reaction chamber for foam fractionating an air/organic loaded water mixture to organic loaded foam and relatively organic free water, ii) a skimmer pump for pumping said air/organic loaded water mixture into said reaction chamber, iii) an outlet port having an outlet port area for egress of said relatively organic free water from said reaction chamber, and iv) an outlet port regulator for controlling said outlet port area for regulating egress of said relatively organic free water from said reaction chamber;

b) an upright upper foam collection cup mounted on said upright lower housing, said foam collection cup having an upright central foam collection neck in flow communication with said reaction chamber for collecting an organic loaded foam column therein and a flow collection surround surrounding said foam collection neck, said foam collection neck having a foam collection neck interior surface, a foam collection neck uppermost rim and a foam collection neck exterior surface, said organic loaded foam column having a highly aerated foam phase towards said foam collection neck uppermost rim and a predominantly water phase beneath said foam phase, said foam collection surrounding being filled with organic loaded waste spilled over from said foam collection neck;

c) an electrical conductivity (EC) sensor deployed in said foam collection neck towards said foam collection neck uppermost rim for sensing foam wetness in said organic loaded foam column's foam phase; and d) a user set controller for controlling fluid flow rate through the protein skimmer in response to said EC sensor's foam wetness reading.

2. The protein skimmer according to claim 1 wherein said skimmer pump is a variable flow DC skimmer pump and said controller is configured to control said variable flow DC skimmer pump's pump rate in response to said EC sensor's foam wetness reading for controlling fluid flow rate through the protein skimmer.

3. The protein skimmer according to claim 1 wherein said outlet port regulator is a motorized outlet port regulator and said controller is configured to control said motorized outlet port regulator in response to said EC sensor's foam wetness reading for controlling fluid flow rate through the protein skimmer.

4. The protein skimmer according to claim 1 wherein said controller is configured to automate a self-leveling procedure including the following steps:

a) setting an optimal fluid flow rate for optimal foam fractionation of said air/organic loaded water mixture to organic loaded foam in said foam collection neck and relatively organic free water egressing though said outlet port;

b) setting a foam wetness threshold at a higher foam wetness than said organic loaded foam's foam wetness at said optimal fluid flow rate;

c) operating the protein skimmer at said optimal fluid flow rate for optional foam fractionating said air/organic loaded water mixture;

d) on detection of a spike in said organic loaded foam's foam wetness above said foam wetness threshold, reducing said fluid flow rate to below said optimal fluid flow rate; and e) incrementally increasing said fluid flow rate to said optimal fluid flow rate.

5. The protein skimmer according to claim 4 wherein, during said incremental increasing said fluid flow rate to said optimal fluid flow rate, before said fluid flow rate equals said optimal fluid flow rate, on detection of a spike in said organic loaded foam's foam wetness above said foam wetness threshold, reducing said fluid flow rate to its previous fluid flow rate before said spike.

6. The protein skimmer according to claim 1 and further comprising a second electrical conductivity (EC) sensor for sensing said organic loaded waste has substantially filled said foam collection surround whereupon said controller reduces fluid flow rate through the protein skimmer for aerating said air/organic loaded water mixture with minimal foam fractionation, if at all, and/or issuing a user alert to empty the foam collection surround.

7. The protein skimmer according to claim 1 wherein each said EC sensor includes an EC sensor housing having an EC sensor housing lowermost surface with a downward depending pair of spaced apart electrodes, each said electrode having an electrode root and an electrode tip correspondingly adjacent and remote from said EC sensor housing lowermost surface, each said electrode having an insulator insulating its electrode root such that said EC sensor is electrically conductive between said pair of spaced apart electrode tips and not electrically conductive between said pair of spaced apart electrode roots.

8. The protein skimmer according to claim 1 and wherein the controller is configured to be in remote communication with a smartphone app for setting said controller and receiving user alerts.

9. A retrofit kit for retrofitting a non self-regulating protein skimmer to a self-regulating protein skimmer, the non self-regulating protein skimmer including:

a) an upright lower housing including:

i) a reaction chamber for foam fractionating an air/organic loaded water mixture to organic loaded foam and relatively organic free water, ii) a skimmer pump for pumping the air/organic loaded water mixture into the reaction chamber, iii) an outlet port having an outlet port area for egress of the relatively organic free water from the reaction chamber, and iv) an outlet port regulator for controlling the outlet port area for regulating egress of the relatively organic free water from the reaction chamber; and b) an upright upper foam collection cup mounted on the upright lower housing, the foam collection cup having an upright central foam collection neck in flow communication with the reaction chamber for collecting an organic loaded foam column therein and a flow collection surround surrounding the foam collection neck, the foam collection neck having a foam collection neck interior surface, a foam collection neck uppermost rim and a foam collection neck exterior surface, the organic loaded foam column having a highly aerated foam phase towards the foam collection neck uppermost rim and a predominantly water phase beneath the foam phase, the foam collection surrounding being filled with organic loaded waste spilled over from the foam collection neck;

the retrofit kit comprising:

a variable flow DC skimmer pump for replacing the skimmer pump;

an electrical conductive (EC) sensor for sensing foam wetness in the organic loaded foam column's foam phase in the foam collection neck; and a user set controller for selectively controlling the variable flow DC skimmer pump's flow rate in response to the EC sensor's foam wetness reading.

10. A retrofit kit for retrofitting a non self-regulating protein skimmer to a self-regulating protein skimmer, the non self-regulating protein skimmer including:

a) an upright lower housing including:

i) a reaction chamber for foam fractionating an air/organic loaded water mixture to organic loaded foam and relatively organic free water, ii) a skimmer pump for pumping the air/organic loaded water mixture into the reaction chamber, iii) an outlet port having an outlet port area for egress of the relatively organic free water from the reaction chamber, and iv) an outlet port regulator for controlling the outlet port area of the outlet port for regulating egress of the relatively organic free water from the reaction chamber; and b) an upright upper foam collection cup mounted on the upright lower housing, the foam collection cup having an upright central foam collection neck in flow communication with the reaction chamber for collecting an organic loaded foam column therein and a flow collection surround surrounding the foam collection neck, the foam collection neck having a foam collection neck interior surface, a foam collection neck uppermost rim and a foam collection neck exterior surface, the organic loaded foam column having a highly aerated foam phase towards the foam collection neck uppermost rim and a predominantly water phase beneath the foam phase, the foam collection surrounding being filled with organic loaded waste from the foam collection neck;

the retrofit kit comprising:

a motorized outlet port regulator;

an electrical conductive (EC) sensor for sensing foam wetness in the organic loaded foam's foam phase in the foam collection neck; and a user set controller for selectively controlling the motorized outlet port regulator in response to said EC sensor's foam wetness reading.

* * * * *